Aug. 22, 1950 — C. M. AVERY — 2,519,339
DYNAMO FIELD CONTROL BY UNSATURATED REACTORS
Filed March 31, 1948 — 3 Sheets-Sheet 1

WITNESSES:

INVENTOR
Curt M. Avery.
BY
Paul E. Friedemann
ATTORNEY

Aug. 22, 1950  C. M. AVERY  2,519,339
DYNAMO FIELD CONTROL BY UNSATURATED REACTORS
Filed March 31, 1948  3 Sheets-Sheet 2

WITNESSES:
E.A. McClosky.
W. L. Groome

INVENTOR
Curt M. Avery.

BY
Paul E. Friedemann
ATTORNEY

Aug. 22, 1950         C. M. AVERY         2,519,339
DYNAMO FIELD CONTROL BY UNSATURATED REACTORS
Filed March 31, 1948                3 Sheets-Sheet 3

WITNESSES:                INVENTOR
                          Curt M. Avery.
                          BY
                          Paul E. Friedemann
                          ATTORNEY Patented Aug. 22, 1950

2,519,339

UNITED STATES PATENT OFFICE 2,519,339

DYNAMO FIELD CONTROL BY UNSATURATED REACTORS

Curt M. Avery, Pittsburgh, Pa., assignor to Westinghouse Electric Corporation, East Pittsburgh, Pa., a corporation of Pennsylvania Application March 31, 1948, Serial No. 18,133

23 Claims. (Cl. 318—158)

This invention relates to control systems in which the field excitation of a dynamo-electric machine is controlled by a saturable reactor in dependence upon a variable premagnetization of the reactor.

It is an object of the invention to apply a saturable reactor for reversible field control in order to obtain a reversible voltage or current of a generator, or a reversible speed or torque of a motor, both kinds of dynamo-electric machines being hereinafter briefly referred to as "dynamos". Another object of the invention is to increase the range of control obtainable with such reactors.

Conventional dynamo control systems have an amplifying auxiliary generator or exciter whose armature output voltage controls the field of a main dynamo in response to a variable or adjustable control voltage applied to the control field of the exciter. When the polarity of the control field is reversed, the output voltage also reverses its polarity. Consequently, the range of variation of the output voltage extends between a positive maximum value and a negative maximum value. This whole range can be made available for the intended control purpose.

If a saturable reactor is used instead of the above-mentioned exciter, the variable reactance winding of the reactor may be energized by alternating current in series-connection with a rectifier whose output voltage is applied to the dynamo field to be controlled. This output voltage is varied by a controlled direct-current excitation which premagnetizes the reactor core. The rectified output voltage has a given polarity regardless of the polarity of the reactor control excitation. For that reason, saturable reactors do not inherently lend themselves to a voltage reversing control, and the variation of the reactor-controlled voltage is limited to a range within the ascending unsaturated portion of only one (positive or negative) branch of the magnetization characteristic.

It would be possible, of course, to use saturable reactors for field control purposes and to reverse the controlled field by disposing reversing switches in the field circuit. This, however, would render the control performance inferior to that of voltage-reversible field exciters which do not require reversing switches in their armature circuit and permit a smooth and stepless transition not obtainable by field switching.

It is, therefore, another object of the invention, more specific than those above mentioned, to apply saturable reactors for reversible field control and to increase the control range of such reactors beyond the range heretofore available without recourse to switching in the reactor-controlled field circuit.

Another object of the invention is to devise a reactor control system for operating a motor at controllable speeds in both running directions. An object is also to design such a motor control system for operation at selectively preset speeds in the forward and reverse direction.

Still another object of the invention is the provision of a system for controlling a dynamo field by electromagnetic control equipment of the static type so as to secure a performance generally comparable to that of the above-mentioned exciter generator but distinguished therefrom by reduced maintenance requirements.

According to the invention, a dynamo has a control field excited from two voltage sources whose respective voltages are opposingly related to each other. One of these field voltages (bias voltage) is normally constant for a given range or polarity of field variation while the other field voltage is variable under control by a saturable reactor operating within the substantially linear and unsaturated portion of its magnetic characteristic.

The reactor, in turn, is controlled by variable premagnetization caused by two control voltages trat are opposingly related to each other. One of these control voltages (pilot voltage) is variable in dependence upon a variable quantity, such as the voltage, current, speed, torque or other operational quantity of the dynamo itself or of equipment energized or driven by the dynamo. The other reactor control voltage (pattern voltage) is independent of the just-mentioned quantity variations. The source or circuit means for providing one of the two reactor control voltages is equipped with voltage-adjusting means, such as a rheostat. Preferably, this voltage-adjusting means or rheostat is associated with the source of the pattern voltage so that the pattern voltage can be selectively adjusted over a given range and, for each selected adjustment, serves as a constant reference for the quantity-responsive pilot voltage.

Within the above-mentioned organization, it is an essential feature of the invention that the two voltages for exciting the control field of the dynamo are dimensioned relative to each other so that the resultant control field is zero or a minimum when the constant reactor control voltage (pattern voltage) is adjusted to a finite magnitude so far different from zero that a change in adjustment of the pattern voltage toward its minimum or zero magnitude causes the dynamo control field to increase through the entire desired range of field control for a given field polarity.

In one aspect of the invention, the above-mentioned finite magnitude of the pattern voltage is intermediate the extremes of the range available for that control voltage; and the dynamo control field is zero at that intermediate adjustment. As a result, the dynamo control field increases from zero toward a maximum of one polarity when the adjustment of the pattern voltage is changed in one sense, while the dynamo control field increases from zero to a maximum of the opposite polarity when the adjustment of the pattern voltage is changed in the other sense, thus making the reactor control suitable for field-reversing control performance.

In another aspect of the invention, one of the sources of the two field voltages, preferably the one for providing the normally constant bias voltage, is also equipped with voltage-adjusting means which may also consist of a rheostat; and this (first) voltage-adjusting means has two selective adjustments for providing low and high voltage magnitudes respectively. The low adjustment of the bias voltage is such that the dynamo control field is zero or a minimum when the previously mentioned (second) adjusting means are set for the minimum or zero value of pattern voltage; and the magnitude of the high bias voltage is such that the dynamo control field is zero or a minimum when the pattern voltage is set for the maximum value. As will be explained in the following, an organization thus designed not only permits a field reversing control performance but also secures a much wider range of control than otherwise obtainable by saturable control reactors without using reversing switches in the field circuit of the controlled dynamo.

The foregoing and other objects and features of the invention will be apparent from the following description of the embodiments illustrated, by way of example, in the drawings.

In the drawing, M denotes a motor, G a generator, S a saturable reactor, R a rectifier, A1 a first voltage adjusting means associated with a field winding of the generator G, and A2 a second voltage adjusting means associated with a control winding of the reactor S.

Figures 1, 2:
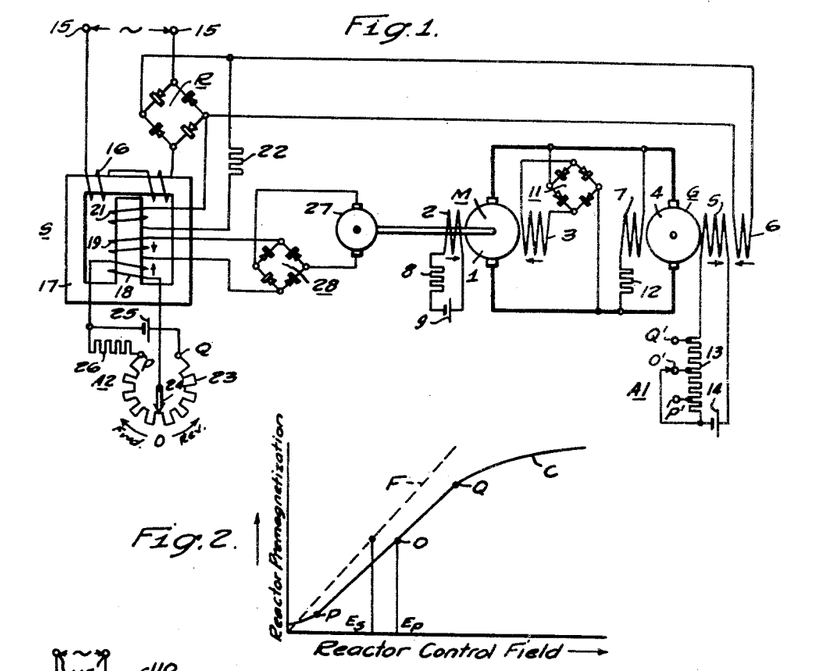
Figure 1 shows the circuit diagram of a reversible speed control system for a variable voltage drive.
Fig. 2 is an explanatory coordinate diagram referring to the system of Fig. 1.

The system shown in Fig. 1 is a variable voltage (Ward-Leonard) drive whose motor M is to operate in either running direction at a speed which remains substantially constant, regardless of load variations, at a value determined by the setting of a speed-adjusting device (adjusting means A2). The armature of the motor M is denoted by 1 and its separately excited field winding by 2. An auxiliary field winding 3, acting differentially with respect to winding 2, may also be provided. The armature 1 of motor M is energized from the armature 4 of the generator G whose field is jointly controlled by three field windings 5, 6 and 7. The motor field winding 2 is connected through a field rheostat 8 to a suitable direct-current source of substantially constant voltage here schematically represented by a battery 9. The auxiliary motor field winding 3, if used, is connected across the generator armature 4 through a rectifier 11 so that the excitation of field winding 3 is proportional to the voltage impressed on the motor armature 1 and has a given polarity regardless of the running direction of the motor.

The generator field winding 7 is shown to be connected across the generator armature 4 in series with a resistor 12. Winding 7 serves to provide self-excitation for the generator and is preferably tuned to the magnetization characteristic of the generator so as to provide most of the field excitation needed to maintain any desired generator output voltage. In other words, the field circuit of winding 7 is preferably given such a resistance, for instance, by properly dimensioning or adjusting the resistor 12, that the field resistance line nearly coincides with the ascending, unsaturated and substantially linear portion of the magnetic characteristic of the generator. As is well known, a similar effect can be obtained by connecting the generator self-exciting field winding serially in the armature loop circuit or by using two self-exciting field windings in compound arrangement.

Field windings 5 and 6 provide the generator with voltage-controlling intelligence and are poled for differential action with respect to each other. Field winding 5 is connected through a rheostat 13 to a direct-current source of substantially constant voltage schematically represented at 14. The rheostat 13 forms part of the above-mentioned first voltage adjusting means A1 and is shown to have three tap contacts at O', P' and Q'. Field winding 6 is connected to the output terminals of the rectifier R and receives direct-current excitation of variable magnitude under control by the saturable reactor S.

The input terminals of rectifier R are connected across alternating-current terminals 15 in series with the main winding 16 of the reactor S. The reactor S, as exemplified by Fig. 1, has a three-legged magnet core 17 whose center leg is equipped with the winding means for controlling the premagnetization of the reactor. The control winding means, as exemplified in Fig. 1, comprise three windings 18, 19 and 21. The windings 18 and 19 are energized and poled to operate in differential relation to each other so that the premagnetization caused by these two windings depends upon the differential value of the respective control voltages imposed thereon. Winding 21 is connected across the output terminals of rectifier R preferably in series with a calibrating resistor 22. Consequently, the winding 21 operates as a feedback. It is preferably dimensioned and energized so that the induction caused thereby is almost but not quite sufficient to maintain the premagnetization of the reactor at a desired value. For instance, the feedback characteristic for winding 21 may correspond to that represented by the broken line F in the reactor characteristic shown in Fig. 2. Under these conditions, the differential control windings 18 and 19 of reactor S are only called upon to provide the additional control induction needed to determine the operating point of the reactor along the ascending and substantially linear portion of its magnetization characteristic, this characteristic being exemplified by the curve C in Fig. 2.

Control winding 18 (pattern winding) of reactor S receives normally constant excitation (pattern voltage) of adjustable magnitude through the second voltage adjusting device A2. This device is shown to consist of a potentiometric rheostat whose resistor and appertaining slide contact are denoted by 23 and 24, respectively. The resistor 23 is connected across a suitable direct-current source of constant voltage schematically represented at 25. The connection may include a series resistor 26.

The control winding 19 (pilot winding) of reactor S receives variable direct-current excitation (pilot voltage) from a pilot generator or tachometer 27 through a rectifier 28. The pilot generator 27 is driven from the armature 1 of motor M so that it represents a source of voltage whose magnitude varies in accordance with the motor speed. Due to the rectifier 28, the polarity of the pilot voltage applied to winding 19 is independent of the motor running direction.

It will be understood that while several individual sources of substantially constant direc-current voltage are shown in Fig. 1, these sources may be combined to a single source and may consist of any suitable device such as a rectifier for connection to the alternating-current terminals 15, or an exciter generator driven by the armature 4 of generator G, or of potentiometric or other circuit means, leads or terminals for attachment to an available direct-current line.

The system operates in the following manner. When the motor M is at rest, the slider 24 of the speed-adjusting device A2 is in a given position intermediate the end points of the available range of slider adjustment. For instance, as shown in Fig. 1, the slider 24 is normally in the midposition, marked O, between the extreme positions P and Q. The pattern winding 18 of the reactor S is then excited by a given constant pattern voltage of a finite, medium magnitude. Consequently, the reactor S is premagnetized so that its magnetization corresponds, for instance, to point O in Fig. 2. The rectifier R impresses a field voltage of medium value on the generator field winding 6 which, if alone effective, would cause the generator G to generate a voltage of finite magnitude. However, the slider of rheostat 13 is so adjusted that the constant field of the generator field winding 5 balances that of field winding 6. Consequently, the generator voltage is zero, the motor remains at rest, and the voltage impressed on the reactor pilot winding 19 is zero.

When under these initial conditions, the slider 24 of device A2 is displaced clockwise, the pattern voltage impressed on the winding 18 is correspondingly reduced. The amplified voltage impressed by rectifier R on the generator field winding 6 is also reduced, while the bias voltage on field winding 5 remains constant. The resultant control field of the generator has a flux direction determined by the bias field winding 5. Therefore, the armature 4 generates voltage and causes the motor M to accelerate in the forward direction up to a speed determined by the setting of the device A2. This speed is maintained at the desired value regardless of variations in motor load due to the regulating action of the pilot winding 19.

When the slider 24 of device A2, starting from the off position O is displaced counterclockwise, the pattern voltage impressed on winding 18 is increased, the amplified voltage supplied from rectifier R to generator field winding 6 is also increased, and the resultant generator control field has the same flux direction as that of field winding 6. Consequently, the generator now produces a voltage of the opposite polarity and causes the motor to run in the reverse direction at a speed determined by the selected setting of the device A2 and regulated by the action of the pilot control winding 19.

The range of speed control is limited by the fact that only about one-half of the straight-line portion of the reactor characteristic (C in Fig. 2) is available for each running direction. The speed range for operation in one direction can be increased at the expense of the speed range in the reverse direction by adjusting the bias rheostat A1 so that the resultant field of windings 5 and 6 is zero when the slider 24 of device A2 is in a desired out-of-center position, for instance when the slider is positioned half way between points O and Q. However, the range of speed control can also be increased by providing the motor M with the above-mentioned auxiliary field winding 3. This field winding is energized in proportion to the generator voltage and since it opposes the main motor field caused by winding 2, the net field of the motor is increasingly weakened with increasing generator voltage.

The system shown in Fig. 1 has been chosen mainly for convenient illustration and explanation, and it should be understood that the invention can be embodied in systems whose component devices and connections involve various alterations and modifications as compared with the particular embodiment of Fig. 1, and that the system may be designed for purposes other than controlling a motor speed. The system shown in Fig. 3 for instance is basically similar to that of Fig. 1 as far as the essential features and functions of the invention are concerned although considerable differences will be recognized as regards design details and circuit connections.

Figure 3:
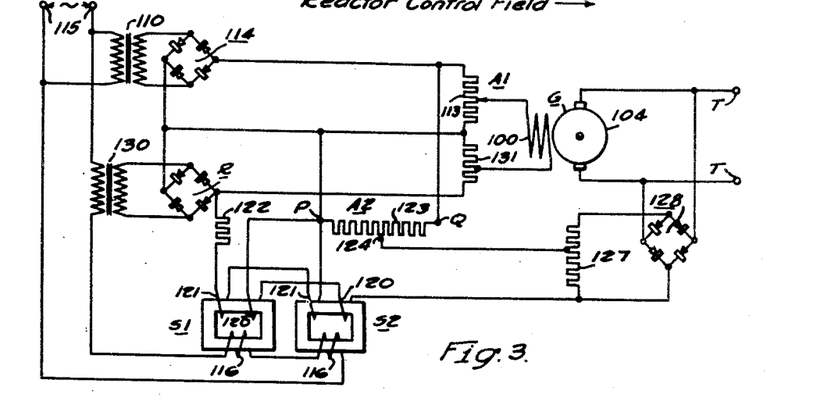
Fig. 3 shows the circuit diagram of a reversible voltage-control system for a generator.

The system according to Fig. 3 serves to control a generator G so that it applies to its output terminals T a constant direct-current voltage of adjustable magnitude and polarity. The generator armature is denoted by 104 and a single generator field winding by 100. The circuit of field winding 100 includes two series-opposed direct-current sources of which one has a normally constant voltage (bias voltage) while the voltage of the other source varies under control by a saturable reactance device in dependence upon the generator output voltage.

The source of constant bias voltage is represented by the tapped off portion of a rheostat 113 appertaining to the first voltage adjusting means A1. Rheostat 113 is energized through a rectifier 114 and a transformer 110 from the alternating-current terminals 115 of the control system. The source of variable field voltage includes the tapped off portion of a rheostat 131 which is connected across the direct-current output terminals of the rectifier R. The input terminals of rectifier R are energized through a transformer 130 whose primary winding is connected across the alternating-current terminals 115 in series connection with the main winding 116 of the saturable reactance device. When the reactive resistance of winding 116 changes, the voltage impressed on the transformer 130 and on the rectifier R changes accordingly. Hence, for the purposes of the invention, the connection between rectifier R and the main reactance coil 116 is equivalent to the series connection represented in Fig. 1.

The reactance device is composed of two individual reactors S1 and S2 each having an unbranched magnetic circuit. The main winding 116 has turns located on the two respective reactor cores. While these turns are shown to be series connected, a parallel connection is likewise applicable. The two individual reactors are provided with a control winding 120 and a feedback winding 121. Each of windings 120 and 121 has turns associated with the respective reactor cores. The polarity of connection of the two sections of each winding 120 and 121 is such that the alternating-current voltages induced in the turns on one reactor are cancelled by the respective voltages induced in the turns on the other reactor. The sections of windings 120 and 121 may be connected in parallel relation to each other rather than in series.

The feedback winding 121 is connected across the output terminals of rectifier R in series with a calibrating resistor 122. Consequently, winding 121 and its connection and excitation correspond to winding 21 in Fig. 1.

The reactor control winding 120 (Fig. 3) is connected in a control circuit which includes two series opposed sources of direct-current voltage. One of these voltage sources is represented by the tapped off portion of a rheostat 123 which forms part of the second voltage-adjusting means A2 and is connected across the rectifier 114 to be impressed by constant voltage (pattern voltage). The magnitude of this pattern voltage depends upon the setting of the slide contact 124 and determines the magnitude and polarity of the voltage to be generated by the generator G. The second voltage source in the circuit of control winding 120 includes a tapped-off portion of a rheostat 127 which is excited from across the generator output terminals T through a rectifier 128. The voltage taken from the tapped off portion 127 and applied to the circuit of control winding 120 (pilot voltage) is proportional in magnitude to the generator output voltage but has a fixed polarity.

When the slider 124 of adjusting device A2 is in a predetermined position, for instance the illustrated midposition, between the extreme points P and Q of the available range of rheostat adjustment, the output voltage of generator G is supposed to be zero. The premagnetization applied to the reactors S1 and S2 due to the excitation of control winding 120 then has a medium value. Consequently, the reactance of winding 116 has a medium value, and the voltage applied by the rectifier R to the tapped-off portion of rheostat 131 has also a medium value. The last-mentioned voltage, if effective across the generator field winding 100, would cause the generator to produce an output voltage. However, the slider of rheostat 113 in the bias adjusting device A1 is so positioned that the field voltage from across rheostat 131 is balanced and the resultant excitation or field winding 100 is zero. Consequently, the generator output voltage is zero and the voltage component across the tapped-off portion of rheostat 127 is also zero. When, with this initial setting of the system, the slider 124 is displaced from its initial position, the generator G develops a regulated output voltage whose polarity is determined by the direction of displacement of slider 124 and whose magnitude corresponds to the extent of the displacement.

When the slider 124 is moved in the opposite direction from its initial setting, the generator G is caused to generate an output voltage of the opposite polarity whose magnitude is again determined by the displacement of the slider 124.

It has been mentioned that in systems of the kind described so far, the range of dynamo field control and hence the range of the desired speed or voltage control is limited because only part of the available linear reactor characteristic can be utilized for control purposes in either direction or polarity of control. While the control range can be increased by providing the field-controlled dynamo with a self-exciting field winding as exemplified by winding 7 in Fig. 1, or by providing a speed-controlled motor with an auxiliary field winding as exemplified by winding 3 in Fig. 1, the invention makes it also possible to utilize all or most of the linear portion of the reactor characteristic for obtaining a maximum range of reversible control in either control direction. How this is achieved will first be explained in principle by reverting to the system illustrated in Fig. 1.

According to Fig. 1, the rheostat 13 has a slide and is equipped with two extreme tap contacts at points P' and Q' on either side of the above-mentioned tap point O'. The voltage range of rheostat 13 is such that when the slider of device A1 is positioned on tap point P', the two field windings 5 and 6 will balance each other, provided the slider 24 of device A2 is on the extreme point P of its range. It will be recognized that then the reactor pattern winding 18 is excited by low voltage and that the field winding 5 of generator G is also excited by low bias voltage. Further, when the slider of rheostat 13 is at point Q', the two field windings 5 and 6 are again balanced, provided the slider 24 in device A2 is then at its extreme point Q. Under the latter conditions, the pattern winding 18 is excited by high voltage and the field winding 5 of generator G is excited by high bias voltage.

With slider 24 on point P and the slider of rheostat 13 on point P', the reactor S is premagnetized only by low pattern voltage, for instance, in accordance with point P in Fig. 2; and the motor M is then at rest. A clockwise displacement of the slider 24 will then cause the motor to run in the forward direction, and the full range of the straight reactor characteristic (for instance between points P and Q in Fig. 2) is available for speed control.

With slider 24 placed on point Q and the slider of rheostat 13 on point Q', the motor is again at rest because the windings 5 and 6 in generator G balance each other, but the reactor S is now highly magnetized, for instance, in accordance with point Q of the characteristic shown in Fig. 2. A counterclockwise displacement of the slider 24 in device A2 will then cause the motor to run in the reverse direction, and the full straight-line portion of the reactor characteristic (from Q to P in Fig. 2) is again available for speed control.

It will be understood from the forgoing that by a proper design and voltage rating of the system components according to Fig. 1 or Fig. 3, the system can be made to afford a maximum range of control if the above-mentioned operating method is employed. According to another feature of the invention, however, the two adjusting means A1 and A2 are interconnected so that the above-mentioned switching of the reactor operating point (for instance, between points P and Q in the characteristic shown in Fig. 2) occurs automatically. Examples of systems according to the invention that embody the just-mentioned feature are described below with reference to Figs. 4 through 7.

Figure 4:
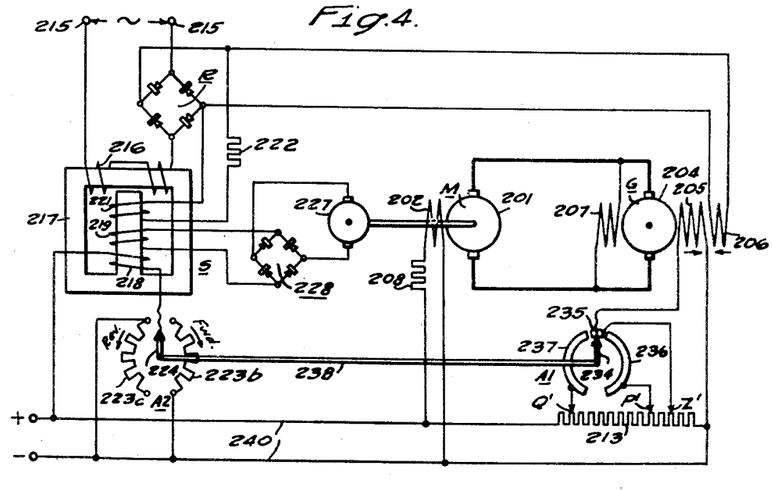
Figs. 4, 5 and 6 show the respective circuit diagrams of three different control systems for variable voltage drives.

The system shown in Fig. 4 serves for controlling a reversible motor to operate at a substantially constant speed of adjustable magnitude. In this respect, the system resembles that of Fig. 1. The voltage-adjusting means A1 and A2 according to Fig. 4 are designed to automatically shift the reactor operating point when the motor-running direction is reversed in order to secure optimum utilization of the linear reactor characteristic for both running directions. Aside from this design and performance of the voltage adjusting means, the system of Fig. 4 is largely similar to that of Fig. 1; and the system elements denoted in Fig. 4 by reference numerals between 201 and 228, inclusive, correspond substantially to the elements of Fig. 1 numbered between 1 and 28, respectively, so that the description of these elements given in the foregoing with reference to Fig. 1 is in substance also applicable to Fig. 4. It will be noted, however, that in Fig. 4 a single pair of direct-current buses 240 takes the place of the current sources denoted in Fig. 1 by 9, 14 and 21, and that the rheostat appertaining to the adjusting means A2 in Fig. 2 has two sections 223b and 223c instead of the single resistor 23 shown in Fig. 1.

The slide contact and adjusting member 224 of the device A2 (Fig. 4) is connected with the pattern winding 218 of the reactor S and is out of engagement with the resistors 223c and 223b when in the illustrated off position. Then the reactor winding 216 has maximum reactance and the voltage applied by rectifier R to the generator field winding 206 is a minimum.

The voltage-adjusting means A1 comprise a switch whose movable contact 234 is engageable with stationary contacts 235, 236 and 237. Contact 235 is connected to one terminal of the generator field winding 205. Contact 235 is connected to a point Z' of rheostat 213. Contacts 236 and 237 are connected to rheostat 213 at points P' and Q'. The movable contact 234 engages the stationary contact 235 when member 224 of device A2 is in the off position. When member 224 engages the resistor 223b, contact 234 is on contact 236. When member 224 is in engagement with resistor 223c, contact 234 is on contact 237. A suitable connection or transmission, represented by a shaft 238, secures the proper movement of contact 234.

When the member 224 of the speed-controlling device A2 is in the off position and the generator field winding 206 excited by minimum voltage, the field of this winding is balanced out by that of the field winding 205 which is then excited by low bias voltage tapped off from the rheostat 213 at point Z'. When the speed-adjusting member 224 is moved clockwise in order to operate the motor M in the forward direction, the reactor pattern winding 218 becomes energized by minimum voltage as soon as member 224 comes into engagement with resistor 223. At the same time, the generator field winding 205 is connected by switch contact 234 with contact 236 and is energized by a bias voltage tapped from rheostat 213 at point P'. Point P' may be chosen so that the generator field windings 205 and 206 are again balanced when the member 224 of device A2 touches its starting point at resistor 223b. Consequently, the motor is then still at rest, but it begins running at progressively increasing speed when the member 224 is advanced clockwise along the resistor 223b. As explained above, the motor can thus be caused to operate at any desired speed within a wide speed range with full utilization of the available straight-line control characteristic of the reactor S.

If the motor M is not intended to run below a given finite minimum speed, point P' may coincide with point Z', or the two contacts 235 and 236 may be integrated to from a single contact element which is connected with point Z'. The provision of two separate rheostat taps for contacts 235 and 236, each tap being adjustable independently of the other, has the advantage of permitting a selection of the motor speed range. That is, the motor can be caused to start operating at any desired minimum speed.

When the speed adjusting member 224 of device A2 is moved from the off position in the counterclockwise direction, a high voltage is applied to the pattern winding 218 as soon as the member 224 comes into engagement with resistor 223c. This high pattern voltage causes a correspondingly high excitation to be imposed on the generator field winding 206, but this high excitation is counteracted and if desired balanced by the high bias voltage then applied to the generator field winding 205 through switch contact 237 from rheostat point Q'. Further movement of member 224 in the counterclockwise direction causes the motor to run at a progressively increasing speed, and the available speed range is again determined by the maximum available extent of the reactor control characteristic.

Figure 5:
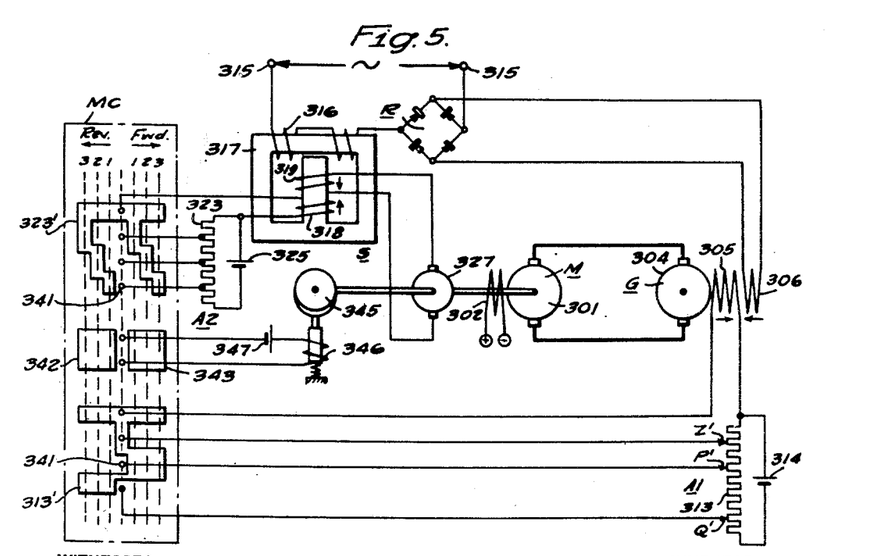

The system illustrated in Fig. 5 serves to control a drive motor by means of a master controller MC of the cam or drum type to operate in either running direction at a speed selected from a number of predetermined speed values. The elements denoted by numerals between 301 and 327 correspond substantially to the elements denoted in Fig. 1 by numbers between 1 and 27, respectively. It is assumed that the pilot generator 327 in Fig. 5 provides a speed-measuring voltage of fixed polarity regardless of the motor-running direction.

The master controller MC has an off position, three sequential speed points for forward operation, and three speed points for reverse operation of the motor. The potentiometric rheostats 313 and 323 of the two voltage-adjusting means A1 and A2 are connected with the contact means of the master controller so that the controller forms a common part of both adjusting means. To this end, the master controller is equipped with contact segments or cams 313' to control the connection of tap leads from rheostat 313, and with contact segments or cams 323' to cooperate with tap leads of the rheostat 323. The stationary contact elements of the master controller are schematically represented by contact fingers or terminals such as those denoted by 341.

Figure 7:
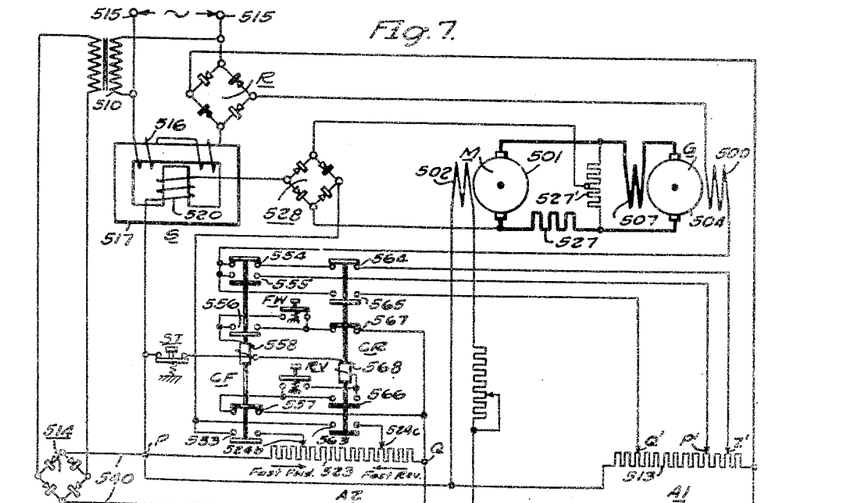
Fig. 7 is the circuit diagram of a modified control system similar to that of Fig. 6 and shown more in detail.

The master controller MC has also two contact segments or cams 342 and 343 for controlling a spring-set friction brake 345 whose brake drum is mounted on the shaft of the motor armature 301. The brake release coil is denoted by 346 and the appertaining current source is schematically shown at 347. As previously explained, the various sources of direct-current indicated in Fig. 5 may consist of any circuit means suitable for this purpose and may be combined or interconnected, for instance as shown in Figs. 4 or 7.

The brake 345 is set when the master controller is in the illustrated off position and is released whenever the master controller is placed in any of its other positions.

In the illustrated off position of controller MC, the pattern winding 318 of reactor S is disconnected from rheostat 323 so that the voltage impressed on generator field winding 306 is a minimum. The field of winding 306 is then biased out by the low voltage then applied to the field winding 305 from rheostat 313 through tap point Z' and through the controller contacts then closed by segment or cam 313'.

When the master controller is placed on point 1, forward, the bias voltage applied to field winding 306 is recalibrated (if desired) and is now taken from a tapped-off portion of rheostat 313 determined by the selected tap point P'. At the same time, the pattern winding 318 is connected across a small portion of rheostat 223 through the controller contacts closed by segments or cams 323'. The differential excitation of field windings 305 and 306 is now such that generator G is caused to energize motor M for operation at low speed in the forward direction.

When the master controller is moved to point 2 or 3, forward, the tapped-off portion of rheostat 323 is increased for correspondingly increased excitation of the pattern winding 318. As a result, the generator provides correspondingly higher voltage, and the motor runs at predetermined medium and maximum speeds, respectively.

When the master controller, starting from the off position, is moved to points 1, 2 and 3, reverse, the field winding 305 of generator G receives high bias voltage tapped off at point Q'. At point 1, reverse, of controller MC a high voltage from rheostat 223 is applied to the pattern winding 318 so that a large portion of the field from winding 305 is cancelled. The differential field then effective in the generator has a low value and has the direction required to operate the motor M in the reverse direction at a desired minimum speed. In positions 2 and 3, reverse, of controller MC, the pattern voltage on winding 318 is increased so that the resultant differential field in generator G increases accordingly and causes the motor M to run at predetermined medium and high speeds, respectively, in the reverse direction. Each selected speed is maintained at a substantially constant value due to the regulating performance of the reactor pilot winding 319 energized from the speed-responsive voltage source (pilot generator) 327.

For the purpose of a regulation for constant speed, the motor field winding 302 may be excited from a source of substantially constant voltage, for instance in the manner similar to the field connections shown in the preceding embodiments. If a system according to Fig. 5 (or according to the other embodiments) is used for securing a desired and selective speed-torque characteristic of the motor rather than a constant speed, the field or motor 301 may be series or compound excited.

Figure 6:
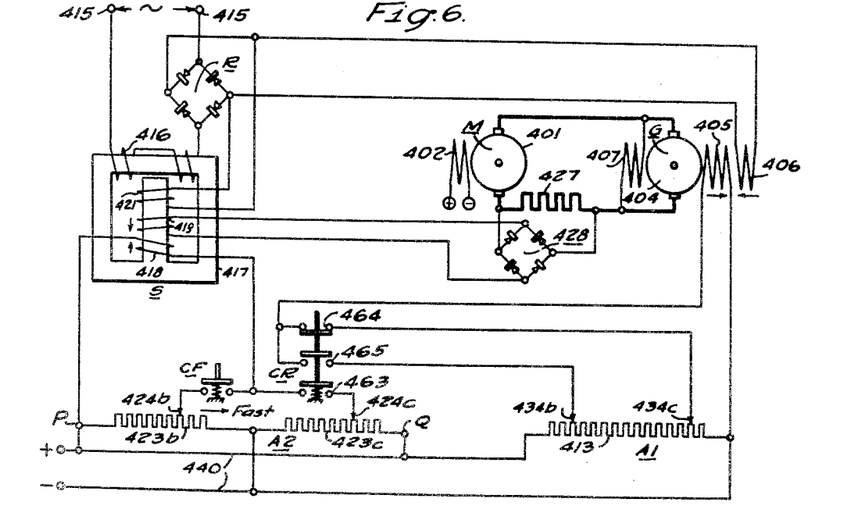

The system represented in Fig. 6 is designed for operating a motor in both running directions at a preset basic speed which is regulated for substantially constant motor load current. Such a performance is desired, for instance, for core type winder drives that are to maintain a substantially constant tension in the winding material during the progressive change in diameter of the reel of material. According to Fig. 6, the motor M has a separately excited field winding 402. The motor armature 401 is connected in a loop circuit with the armature 404 of a generator G with two mutually differential field windings 405 and 406 and a shunt field winding 407. The loop circuit includes a series resistor 427.

Field winding 406 is excited by variable direct-current voltage through rectifier R under control by the saturable reactor S. The rectifier R is connected to alternating current terminals 415 in series with the main winding 416 of the reactor. The center leg of the three-legged reactor core 417 is equipped with two mutually differential control windings 418 and 419 and has also a feed-back winding 421.

Control winding 419 is connected across the series resistor 427 through a rectifier 428 and is excited by pilot voltage which varies in proportion to the motor load current but has a fixed polarity. The circuit of control winding 418 is controlled by switching devices during CF, CR and is excited by constant pattern voltage whose magnitude is preset by the voltage-adjusting device A2.

The generator field winding 405 is connected across the rheostat 413 of the voltage-adjusting device A1. This rheostat has two taps 434b and 434c, of which only one is effective at a time depending upon the position of the switching device CR.

The voltage-adjusting device A2 has two rheostats 423b and 423c which are connected across direct-current buses 440 and equipped with respective sliders 424b and 424c. The switching device CR has contacts 463, 464 and 465. The two switching devices CF and CR may consist of push-button contacts or electromagnetic contactors depending upon the particular application of the system, and it is assumed that they are either mutually interlocked or otherwise so operated that only one of them is actuated at a time.

In the illustrated off position of switches CF and CR, the pattern winding 418 of reactor S is deenergized so that the field voltage impressed on generator winding 406 is a minimum. At the same time, the generator field winding 405 is connected through contact 464 to tap 434c and receives low bias voltage to balance the field of winding 405. Consequently, the generator voltage is zero, the motor is at rest, and the voltage impressed on reactor pilot winding 419 is zero.

When switch CF is closed, the pattern winding 418 is excited by a voltage whose magnitude is determined by the preselected position of slider 424b. The motor will now run in the forward direction at a preselected speed.

When switch CR is actuated, switch CF then being open, the pattern winding 418 is connected through contact 463 to slide 424c so that a voltage tapped off from the rheostat 423c is applied to the winding. This voltage depends upon the preselected adjustment of slider 424c. A correspondingly amplified field voltage is then applied to the generator field winding 406. At the same time, the generator field winding 405 is connected through contact 465 to the tap 434b of rheostat 413. A high bias voltage is now applied to the field winding 405 so that the differential field of windings 405 and 406 is balanced or a minimum when the slider 424c is adjusted to provide maximum pattern voltage. As explained above, this makes it possible to utilize most or all of the linear reactor characteristic. Thus, the basic speed of motor M can be preset to any value within a wide range for forward and reverse operation merely by adjusting the sliders 424b and 424c accordingly.

The particular rheostat arrangement of device A2 shown in Fig. 6 has the advantage that the slider 424b for forward speed and the slider 424c for reverse speed change the respective speeds in the same sense when displaced in the same direction. The respective speeds increase when moving the slides toward the right.

In the system shown in Fig. 7 a reversible motor is controlled to operate at a constant speed of preselected magnitude. Some details of the system are similar to details of embodiments previously described. As regards such similarities, the last two digits of the reference numerals in Fig. 7 are identical with the last two digits of the reference numerals applied to functionally comparable elements of the other embodiments.

In the system according to Fig. 7, all direct-current sources of normally constant voltage are connected to a single pair of buses 540 energized from the alternating-current terminals 515 of the system through a transformer 510 and a rectifier 514.

For optimum utilization of the available winding space, the generator G has a single control field winding 500 and the reactor S has a single control winding 520.

The source of variable control voltage (pilot voltage) for control winding 520 of reactor S consists of a combination of a series resistor 527 and a shunt resistor 527' connected with the motor armature circuit. The total voltage drop across the tapped portion of resistor 527 in series with the resistor 527' is proportional to the counter E. M. F. of the motor M and, therefore, a measure of the motor speed. This voltage is impressed through rectifier 528 on the circuit of control winding 520 in series opposition to the normally constant control voltage (pattern voltage) taken from across a selectively tapped portion of the rheostat 523 in the speed-adjusting device A2. Consequently, the differential value of the two component control voltages is effective across the reactor control winding 520.

The circuit of the generator field winding 500 also includes two sources of direct-current voltage. One of these sources is represented by the rectifier R and the other by a tapped portion of the rheostat 513 of the voltage-adjusting device A1. The component field voltage supplied from the rectifier R is variable and controlled by the reactor S. The component field voltage (bias voltage) taken from across the rheostat 513 has normally a constant value whose magnitude depends upon which of the taps of the rheostat 513 is connected to the field circuit.

The system has a normally open control contact FW, such as a push button, for starting the motor M to run in the forward direction, and a normally open control contact RV, for instance also a push button, for starting the motor M to run in the reverse direction. A normally closed control contact or push button ST is provided for stopping the motor. The system has two control relays CF and CR. Relay CF has contacts 553 through 557 controlled by a coil 558, and relay CR has corresponding contacts 563 through 567 controlled by a coil 568.

When the system is in the illustrated condition of rest, the circuit of the reactor control winding 520 is open so that the reactor is not premagnetized and the variable field voltage from rectifier R is a minimum. The circuit of generator field winding 500 extends through contacts 564, 554 and the tap of rheostat 513 at point Z'. This point is so chosen that the small voltage tapped from the rheostat 513 balances the voltage from rectifier R. Consequently, the generator field winding 500 is not excited, and the generator output voltage is zero.

When contact FW is actuated, relay CF picks up because its coil 558 is now energized in a circuit which extends across the buses 530 and includes the stop contact ST, the contact FW, and the contact 567. Relay contact 556 short-circuits the start contact FW so that coil 558 remains thereafter energized until the stop contact ST is actuated. Contact 557 of relay CF is now opened and prevents a subsequent actuation of relay CR as long as relay CF remains picked up. Contact 553 closes the circuit of reactor control coil 520. This circuit now includes a portion of rheostat 523 that extends between point P and slider 524b. As a result, an adjusted constant pattern voltage is effective across the reactor control coil 520 and causes the rectifier R to increase its output voltage. This output voltage is opposed in the generator field circuit by a smaller bias voltage tapped from the rheostat 513 whose tap point P' is now connected in the generator field circuit through the contact 554, while the tap point Z' is disconnected from the field circuit due to the opening of contact 554. The field voltage from rectifier R now predominates and causes the generator field to assume a finite value of corresponding polarity. As a result, the generator G energizes the motor M to accelerate in the forward direction. As the motor accelerates, a correspondingly increasing pilot voltage is impressed through the rectifier 528 on the circuit of reactor control winding 520. Hence, the motor accelerates up to the speed at which the resultant differential excitation of control winding 520 is balanced. From then on, the motor speed remains regulated at the desired value due to the differential control function of the two reactor control voltages. The magnitude of the speed thus regulated depends upon the selected setting of the slider 524b in the speed-adjusting device A2. The speed is a minimum when slider 524b is close to the extreme point P of its adjustment range and increases with increasing displacement of slider 524b away from point P. For the reasons explained previously, a wide range of adjustable speeds is available because virtually the entire useful control range of the reactor characteristic can be utilized.

When, starting from the position of rest, the contact RV is depressed, relay CR picks up and seals itself in, at contact 566, until the stop contact ST is depressed. Contact 567 of relay CR then prevents the relay CF from picking up, and contact 565 connects the generator field winding 500 to the tap of rheostat 513 at point Q'. The contact 563 of relay CR closes the circuit of the reactor control coil 520, but this circuit now extends through the slider 524c of rheostat 523. Consequently, since now initially a high bias voltage from rheostat 513 is impressed on the motor field circuit, the polarity of this voltage determines the running direction of the motor so that the motor is caused to accelerate in the reverse direction until it reaches a speed at which the pilot voltage from rectifier 528 substantially balances the pattern voltage taken from across the portion of rheostat 513 between point P and slider 524c. The magnitude of the speed then reached depends upon the preselected setting of slider 524c and is the smaller the closer the slider 524c is to the extreme point Q of its adjusting range. The provision of a tap contact or slider at point Z' in device A*l*, separate from the tap or slider at point P' offers the advantage of permitting a correct balancing of the generator field when the system is in stop condition while also permitting a selection of the minimum speed at which the motor is to operate in either running direction. As a result, the control characteristic of the reactor can be fully utilized to best advantage.

Systems according to the invention may be equipped with protective and other auxiliary equipment generally customary with control systems. In particular, a switch or contactor (not shown) may be provided in the above-mentioned motor control systems in order to disconnect the motor armature from the generator in the off condition of the control system. It is then not necessary to fully balance the generator control field when the motor is at rest. The invention can further be applied for field control of a reversible motor. The variable-reactor controlled field voltage and the differential bias voltage are then impressed on one or two field windings of a motor instead of to the field winding or windings of a generator.

While various modifications of the invention are illustrated and specifically described in this disclosure, it will be obvious to those skilled in the art, after a study of this disclosure, that various other modifications and changes can be made without departing from the objects and essence of the invention and within the scope of its essential features as set forth in the claims annexed hereto.

I claim as my invention:

1. A dynamo field control system, comprising a dynamo having control field means, two field-voltage sources connected to said field means in opposing relation to each other, one of said sources having normally constant voltage, a saturable reactor connected to said other source and having control winding means for varying the voltage of said other source, a condition-responsive source of variable control voltage and a source of normally constant control voltage connected to said winding means in opposing relation to each other, said latter source having voltage-adjusting means for varying said constant control voltage, said adjusting means having a given adjustment at which said constant control voltage has a finite value, the differential value of said two field voltages being a minimum when said adjusting means has said given adjustment, and said adjusting means being adjustable from said given adjustment toward an extreme adjustment to reduce said constant control voltage to a minimum for varying the field of said control field means from a minimum to a maximum through a desired range of field control.

2. A dynamo field control system, comprising a dynamo having control field means, two field-voltage sources connected to said field means in opposing relation to each other, one of said sources having normally constant voltage, a saturable reactor connected to said other source and having control winding means for varying the voltage of said other source, a condition-responsive source of variable control voltage and a source of normally constant control voltage connected to said winding means in opposing relation to each other, said latter source having voltage-adjusting means for varying said constant control voltage, said adjusting means having a given adjustment at which said constant control voltage has a finite value and being adjustable over given respective ranges in either sense from said given adjustment toward minimum and maximum values respectively of said constant control voltage, said two field voltages being balanced relative to their effect on said field means when said adjusting means has said given adjustment so that said effect increases with one and the other polarity when said adjusting means is adjusted from said given position in one and the other sense respectively.

3. A dynamo field control system, comprising a dynamo having control field means, two field-voltage sources connected to said field means in opposing relation to each other, one of said sources having normally constant voltage, and including first adjusting means for adjusting the magnitude of said constant voltage, a saturable reactor connected to said other source and having control winding means for varying the voltage of said other source, a condition-responsive source of variable control voltage and a source of normally constant control voltage connected to said winding means in opposing relation to each other, said latter source having second voltage-adjusting means for varying said constant control voltage, said second adjusting means being adjustable over a given range between two limit adjustments for minimum and maximum respectively of said constant control voltage, said first adjusting means having two selective adjustments for a low and high constant field voltage respectively, said low voltage being rated to substantially balance said other field voltage for said minimum of said constant control voltage, and said high voltage being rated to substantially balance said other field voltage for said maximum of said constant control voltage.

4. A dynamo field control system, comprising a dynamo having control field means, two field-voltage sources connected to said field means in opposing relation to each other, one of said sources having normally constant voltage and including first adjusting means for adjusting the magnitude of said constant voltage, a saturable reactor connected to said other source and having control winding means for varying the voltage of said other source, a condition-responsive source of variable control voltage and a source of normally constant control voltage connected to said winding means in opposing relation to each other, said latter source having second voltage-adjusting means for varying said constant control voltage, said second adjusting means having a movable member deflectable from a given position in either direction for varying said constant control voltage from a minimum toward higher values when deflected in one direction and from a maximum toward lower values when deflected in the other direction, said first adjusting means having two adjustments for low and high values respectively of said constant field voltage rated to substantially balance said other field voltage for said minimum and maximum respectively of said constant control voltages, and means interconnecting said first and second adjusting means to select said low value when said member deflects in said one direction and to select said high value when said member deflects in said other direction.

5. In combination, a dynamo having field control means with two mutually differential excitation circuits, a saturable reactor and a rectifier series connected with each other to be energized by alternating current, said rectifier being secondarily connected to one of said excitation circuits, direct-current supply means connected to said other excitation circuit, said reactor having two mutually differential control circuits, a source of variable control voltage connected to one of said control circuits, direct-current supply means connected to said other control circuit, one of said control circuits including selective voltage-adjusting means adjustable over a given range, and said control field means having substantially zero excitation when the adjustment of said voltage-adjusting means is at a given point between the extremes of said range.

6. A dynamo control system, comprising a generator having two mutually differential field excitation circuits, a saturable reactor having an alternating-current winding and having two mutually differential control circuits for varying the reactance of said winding, a rectifier primarily connected in series with said winding and secondarily connected with one of said excitation circuits to impress rectified voltage thereon, direct-current supply means connected to said other excitation circuit to impress bias voltage thereon, a condition-responsive direct-current source connected to one of said control circuits and associated with said generator to impress on said one control circuit a pilot voltage variable in dependence upon a condition controlled by said generator, direct-current supply means connected to said other control circuit to impress a pattern voltage thereon, one of said control circuits having voltage-adjusting means for adjusting over a given range the voltage impressed on said one circuit, and said two excitation circuits being balanced against each other when said adjusting means has a given adjustment intermediate the extremes of said range.

7. A dynamo control system, comprising a generator having field means with two field excitation circuits poled for mutually opposing field control, a saturable reactor having an alternating-current main winding and direct-current control winding means with two control circuits poled for mutually opposing reactance control, a rectifier series-connected to said main winding and output-connected to one of said excitation circuits to provide it with rectified field voltage, direct-current supply means connected to said other excitation circuit to provide it with normally constant bias voltage, a direct-current source of variable pilot voltage controlled by said generator and connected with one of said control circuits, direct-current supply means connected to said other control circuit and having voltage control means adjustable over a given range for providing adjustable pattern voltage dependent upon the adjustment of said control means, said bias voltage and said rectified voltage being balanced against each other to have zero effect on said generator when the adjustment of said control means is at a given point intermediate the extremes of said range so that the polarity of the output voltage of said generator depends upon the direction of departure of said control means from said intermediate adjustment.

8. A dynamo control system, comprising a direct-current motor, a generator having an armature loop-connected with said motor to provide variable voltage therefor and having two mutually differential field excitation circuits, a saturable reactor having an alternating-current winding and having two mutually differential control circuits for varying the reactance of said winding, a rectifier primarily connected in series with said winding and secondarily connected with one of said excitation circuits to impress rectified voltage thereon, direct-current supply means connected to said other excitation circuit to impress bias voltages thereon, a condition-responsive source of direct-current voltage connected with one of said control circuits and associated with said motor to impress on said one control circuit a pilot voltage variable with an operating condition of said motor, one of said control circuits having voltage-adjusting means for adjusting over a given range the voltage impressed on said one circuit, and said two excitation circuits being balanced against each other when said adjusting means has a given adjustment intermediate the extremes of said range.

9. A dynamo control system, comprising a direct-current motor, a generator having an armature loop-connected with said motor to provide variable voltage therefor and having field means with two field excitation circuits poled for mutually differential control of said voltage, a saturable reactor having an alternating-current main winding, and direct-current control winding means with two control circuits poled for mutually opposing reactance control, a rectifier series-connected to said main winding and output-connected to one of said excitation circuits to provide it with rectified voltage, a source of variable pilot voltage connected to said motor and attached to one of said control circuits to excite said one control circuit in accordance with the motor speed, direct-current supply means connected to said other control circuit and having voltage control means adjustable over a given range for providing adjustable pattern voltage dependent upon the adjustment of said control means, said bias voltage and said rectified voltage being balanced against each other when the adjustment of said control means is at a given point intermediate the extremes of said range so that said motor runs at a speed and in a direction dependent respectively upon magnitude and direction of departure of said control means from said intermediate adjustment.

10. A dynamo control system, comprising a generator having field means with two field excitation circuits poled for mutually opposing field control, a saturable reactor having an alternating-current main winding and a direct-current feedback winding and direct-current control winding means with two control circuits poled for mutually opposing reactance control, a rectifier series-connected to said main winding and output-connected to one of said excitation circuits to provide it with rectified voltage, said feedback winding being connected with said one excitation circuit, direct-current supply means connected to said other excitation circuit to provide it with normally constant bias voltages, a source of variable direct-current pilot voltage controlled by said generator and connected with one of said control circuits, direct-current supply means connected to said other control circuit and having a rheostat adjustable over a given range for providing adjustable pattern voltage, said bias voltage being adjusted relative to said rectified voltage to cause said generator to have zero voltage when the adjustment of said rheostat is at a given point intermediate the extremes of said range to permit reversing the generator voltage by changing the rheostat adjustment in one or the other direction away from said point.

11. A dynamo control system, comprising a generator having an armature circuit and a self-exciting field winding connected with said armature circuit and two mutually differential control field windings, a saturable reactor having an alternating-current main winding and having direct-current control winding means with two mutually opposing control circuits, a rectifier having an input circuit series-connected with said main winding and having output terminals connected to one of said control field windings to impress rectified voltage thereon, a direct-current circuit connected to said other control field winding to impress thereon a normally constant bias voltage, direct-current voltage supply means controlled by the output of said generator and connected to one of said control circuits to impress thereon a variable pilot voltage, direct-current supply means connected to said other control circuit and having a rheostat adjustable over a given range for providing adjustable pattern voltage in accordance with the adjustment of said rheostat, said bias voltage being adjusted relative to said rectified voltage to cause said generator to have zero voltage when the adjustment of said rehostat is at a given point intermediate the extremes of said range to permit reversing the generator voltage by changing the rheostat adjustment in either direction away from said point.

12. A dynamo control system, comprising a generator and a motor having a common armature circuit and having respective field means, a saturable reactor having an alternating-current main winding and direct-current control winding means, a rectifier having an input circuit series connected with said main winding and having an output circuit connected with said generator field means for controlling the generator voltage impressed on said armature circuit, direct-current supply means connected to said control winding means to provide pattern voltage therefor, and having control means adjustable over a given range for varying said pattern voltage, said control means having a given position intermediate the extremes of said range when said generator voltage is zero, and rectifier means connecting said motor field means with said loop circuit for weakening the motor field with increasing departure of said control means from said given position regardless of the direction of said departure.

13. In a control system according to claim 12, said motor having field means with two differentially interrelated field excitation circuits, direct-current supply means connected with one of said differential circuits, and rectifier means connecting said other differential circuit across said armature for weakening the motor field with increasing generator voltage regardless of the polarity of said generator voltage.

14. A dynamo control system, comprising a generator and a motor having a common armature circuit and having respective field means, a saturable reactor having an alternating-current main winding and direct-current control winding means, a rectifier having an input circuit series connected with said main winding and having an output circuit connected with said generator field means for controlling the generator voltage impressed on said armature circuit, direct-current supply means connected to said control winding means to provide pattern voltage therefor and having control means adjustable over a given range for varying said pattern voltage to thereby vary the voltage of said generator, said motor having field means with two mutually differential field excitation circuits, direct-current supply means connected with one of said differential circuits to provide main field excitation for said motor, and circuit means connecting said other differential circuit with said armature circuit for weakening the motor field with increasing voltage of said generator.

15. In combination, a dynamo having field control means with two mutually differential excitation circuits, a saturable reactor and a rectifier series connected with each other to be energized by alternating current, said rectifier being secondarily connected to one of said excitation circuits, direct-current supply means connected to said other excitation circuit, said reactor having two mutually differential control circuits, a source of variable control voltage connected to one of said control circuits, direct-current supply means of normally constant control voltage connected to said other control circuit, one of said control circuits including selective voltage-adjusting means adjustable between two points corresponding to a high and low ratio of said two control voltages, and another voltage-adjusting means disposed in one of said excitation circuits and having two adjustments at which the excitation of said control field means is substantially zero when said first voltage-adjusting means is adjusted to said two points respectively.

16. A dynamo control system, comprising a generator having two mutually differential field excitation circuits, a saturable reactor having an alternating-current winding and having two mutually differential control circuits for varying the reactance of said winding, a rectifier primarily connected in series with said winding and secondarily connected with one of said excitation circuits, direct-current supply means connected to said other excitation circuit and having first adjusting means for impressing adjustable bias voltages on said other excitation circuit, a condition-responsive source of direct-current voltage connected to one of said control circuits and associated with said generator to impress on said one control circuit a pilot voltage variable in dependence upon a condition controlled by said generator, direct-current supply means connected to said other control circuit and having second voltage adjusting means adjustable over a voltage range between two limit adjustments corresponding to relatively high and low voltages respectively, said first adjusting means having an adjustment in which said two excitation circuits are substantially balanced when said second adjusting means has one of said limit adjustments, and said first adjusting means having another adjustment in which said two excitation circuits are substantially balanced when said second adjusting means has said other limit adjustment.

17. A dynamo control system, comprising a generator having two mutually differential field excitation circuits, a saturable reactor having an alternating-current winding and having two mutually differential control circuits for varying the reactance of said winding, a rectifier primarily connected in series with said winding and secondarily connected with one of said excitation circuits, direct-current supply means for impressing voltage on said other excitation circuit, a condition-responsive source of direct-current voltage connected to one of said control circuits and associated with said generator to impress on said one control circuit a pilot voltage variable in dependence upon a condition controlled by said generator, direct-current supply means connected to said other control circuit for impressing voltage thereon, first voltage-adjusting means disposed in one of said excitation circuits to permit balancing said two excitation circuits, second voltage-adjusting means disposed in one of said control circuits and having a range of voltage adjustment between a given high voltage and a given low voltage, said first means having one adjustment in which said excitation circuits are substantially balanced when said second means is adjusted to said high voltage, and said first means having another adjustment in which said excitation circuits are balanced when said second means is adjusted to said low voltage.

18. A control system according to claim 17, comprising selective control means connected with said first and second voltage-adjusting means for correlating their respective changes in adjustment so as to automatically place said first means in one and the other adjustment when said second means is adjusted between said high and low voltages respectively.

19. A control system according to claim 17, comprising selective control means forming part of said second voltage-adjusting means for adjusting it to said high and low voltages respectively, a switch connected to said first voltage-adjusting means for changing it between said two balance adjustments, said selective control means and said switch being interconnected so that said switch is placed in the respective balancing positions when said second means is adjusted for said high and low voltages.

20. In combination, a variable-voltage drive comprising a motor and a generator with loop-connected respective armatures, said generator having control field means with two mutually differential excitation circuits, a saturable reactor having an alternating-current winding and two mutually differential direct-current control circuits, a rectifier primarily connected in series with said winding and secondarily connected to one of said excitation circuits, a condition-responsive voltage source controlled by said drive and connected to one of said control circuits to provide it with variable pilot voltage, direct-current supply means having first rheostat means connected to said other control circuit to provide pattern voltage therefor and having contact means associaed with said rheostat means and selectively operable to change said pattern voltage between a low and a high value, direct-current supply means having a second rheostat means with two tap points and having a selector switch connected between said points and said other excitation circuit and having two switch positions to adjust the excitation of said control field means to substantially zero when said pattern voltage has said low and said high value respectively, and means interconnecting said contact member and said switch for joint operation so that increase of said pattern voltage from said low value causes said field excitation to increase with one polarity when said switch is in one position while decrease of said pattern voltage from said high value causes said field excitation to increase with opposite polarity.

21. In combination, a variable-voltage drive comprising a motor and a generator with loop-connected respective armatures, said generator having control field means with two mutually differential excitation circuits, a saturable reactor having an alternating-current winding and two mutually differential direct-current control circuits, a rectifier primarily connected in series with said winding and secondarily connected to one of said excitation circuits, a condition-responsive voltage source controlled by said drive and connected to one of said control circuits to provide it with variable pilot voltage, direct-current supply means having first rheostat means connected to said other control circuit to provide pattern voltages therefor and having a contact member selectively movable from an off position in either direction and associated with said rheostat means to decrease said pattern voltage from a high value when moved in one direction while increasing said pattern voltage from a low value when moved in the other direction, a switch having two main positions and an intermediate off position and being connected with said contact member to assume said respective main positions when said member is moved in said respective directions, direct-current supply means having second rheostat means connected with said other excitation circuit under control by said switch to impress on said other excitation circuit a high voltage when said contact member is moved in said one direction and a low voltage when said contact member is moved in said other direction.

22. In combination, a variable-voltage drive comprising a motor and a generator with loop-connected respective armatures, said generator having control field means with two mutually differential excitation circuits, a saturable reactor having an alternating-current winding and two mutually differential direct-current control circuits, a rectifier primarily connected in series with said winding and secondarily connected to one of said excitation circuits, a condition-responsive voltage source controlled by said drive and connected to one of said control circuits to provide it with variable control voltage, direct-current supply means having a rheostat with two tap points selectively connectable to said other control circuit to provide it with low and high pattern voltages respectively, two selectively operable contact devices interposed between said tap points and said other control circuit so that only one pattern voltage is effective at a time, direct-current supply means having two tap points for low and high voltages connected to said other excitation circuit through said contact devices so that only said two low voltages are simultaneously effective when one device is actuated and only said two high voltages are simultaneously effective when said other device is actuated.

23. In combination, a variable-voltage drive comprising a motor and a generator with loop-connected respective armatures, said generator having control field means with two mutually differential excitation circuits, a saturable reactor having an alternating-current winding and two mutually differential direct-current control circuits, a rectifier primarily connected in series with said winding and secondarily connected to one of said excitation circuits, a speed-responsive voltage source controlled by said drive and connected to one of said control circuits, direct-current supply means having a voltage-adjusting rheostat with two taps for presetting desired forward and reverse motor speeds and having two selectively actuable contact devices connected between said respective taps and said one control circuit for applying respectively low and high voltages to said one control circuit dependent upon which device is actuated, direct-current supply means having another rheostat with two taps connected to said other excitation circuit for applying thereto low and high voltages respectively, said contact device having respective contacts disposed between said other excitation circuit and said latter two taps respectively so that actuation of one device makes both low voltages simultaneously effective while actuation of the other device makes both high voltages simultaneously effective for selectively operating said motor in either running direction at preset respective speeds.

CURT M. AVERY.

REFERENCES CITED

The following references are of record in the file of this patent:

FOREIGN PATENTS

| Number | Country | Date |
|--------|---------|------|
| 361,984 | Italy | Aug. 9, 1938 |